(12) United States Patent
Essing et al.

(10) Patent No.: US 11,498,861 B2
(45) Date of Patent: Nov. 15, 2022

(54) APPARATUS FOR AND METHOD OF PROCESSING A SLURRY CONTAINING ORGANIC COMPONENTS

(71) Applicant: SCW Systems B.V., Alkmaar (NL)

(72) Inventors: Gerardus Cornelis Otto Bernard Essing, Schoorl (NL); Douglas Scott Hendry, Haarlem (NL)

(73) Assignee: SCW Systems B.V., Alkmaar (NL)

( * ) Notice: Subject to any disclaimer, the term of this patent is extended or adjusted under 35 U.S.C. 154(b) by 238 days.

(21) Appl. No.: 15/569,475

(22) PCT Filed: Apr. 28, 2016

(86) PCT No.: PCT/EP2016/059546
§ 371 (c)(1),
(2) Date: Oct. 26, 2017

(87) PCT Pub. No.: WO2016/174163
PCT Pub. Date: Nov. 3, 2016

(65) Prior Publication Data
US 2018/0354834 A1    Dec. 13, 2018

(30) Foreign Application Priority Data

Apr. 29, 2015   (EP) ..................... 15165677

(51) Int. Cl.
*C02F 11/08*    (2006.01)
*B01J 19/20*    (2006.01)
(Continued)

(52) U.S. Cl.
CPC ............. *C02F 11/086* (2013.01); *B01J 3/008* (2013.01); *B01J 19/0066* (2013.01);
(Continued)

(58) Field of Classification Search
CPC ........ C02F 11/086; C02F 11/125; C10G 1/02; C10G 2300/1011; B01J 3/008;
(Continued)

(56) References Cited

U.S. PATENT DOCUMENTS 5,289,640 A * 3/1994 McCabe ................. C02F 11/12
34/182
5,461,648 A * 10/1995 Nauflett ................. C02F 11/086
376/305
(Continued)

FOREIGN PATENT DOCUMENTS

AU    2011200090 A1 * 2/2011   ............... C01C 1/04
CA    2522384 C * 3/2012   ............... F23G 1/00
(Continued)

OTHER PUBLICATIONS

Machine translation of FR 2810312 A1 (2001) (obtained from google patents Oct. 2019) (Year: 2001).*
(Continued)

*Primary Examiner* — Hayden Brewster
(74) *Attorney, Agent, or Firm* — Steven M. Koehler; Westman, Champlin & Koehler, P A.

(57) ABSTRACT

The invention relates to an apparatus (1) for processing a slurry containing organic components, such as biomass, having a water contents of at least 50%, comprising a heat exchanger (7) to heat the slurry and a reactor (8) to convert at least a part of the organic components in the slurry, wherein at least one of the heat exchanger (7) and the reactor (8) comprises one or more pipes (7A; 8A). At least one transport screw (15) is accommodated in the pipe (7A; 8A) or at least one of the pipes (7A; 8A).

21 Claims, 1 Drawing Sheet

(51) Int. Cl.
  *B01J 3/00*    (2006.01)
  *C02F 11/125*  (2019.01)
  *B01J 19/18*   (2006.01)
  *B01J 19/00*   (2006.01)
  *C10G 1/02*    (2006.01)

(52) U.S. Cl.
  CPC ........... *B01J 19/1812* (2013.01); *B01J 19/20* (2013.01); *C02F 11/125* (2013.01); *C10G 1/02* (2013.01); *B01J 2219/00092* (2013.01); *B01J 2219/00094* (2013.01); *B01J 2219/00159* (2013.01); *C10G 2300/1011* (2013.01)

(58) Field of Classification Search
  CPC .... B01J 19/0066; B01J 19/1812; B01J 19/20; B01J 2219/00092; B01J 2219/00094; B01J 2219/00159
  See application file for complete search history.

(56) References Cited

U.S. PATENT DOCUMENTS

| | | | |
|---|---|---|---|
| 6,054,103 A | 4/2000 | Mandel | |
| 2002/0192774 A1* | 12/2002 | Ahring | C02F 9/00 435/162 |
| 2003/0075514 A1 | 4/2003 | Hazlebeck et al. | |
| 2009/0215912 A1 | 8/2009 | Goto et al. | |
| 2013/0338382 A1 | 12/2013 | Kondo et al. | |
| 2014/0115955 A1* | 5/2014 | McNeff | B01J 3/008 44/437 |

FOREIGN PATENT DOCUMENTS

| | | | | |
|---|---|---|---|---|
| DE | 29913370 U1 | 9/1999 | | |
| EP | 1829920 A1 | 5/2007 | | |
| FR | 2810312 A1 * | 12/2001 | ............. | C02F 11/06 |
| GB | 2453111 A1 | 4/2009 | | |
| JP | H11138198 A | 5/1999 | | |
| JP | 2001046854 A | 2/2001 | | |
| JP | 2001046854 A1 | 2/2001 | | |
| JP | 2004160333 A | 6/2004 | | |
| JP | 2004313936 A | 11/2004 | | |
| JP | 2005246153 A | 9/2005 | | |
| JP | 2007198614 A | 8/2007 | | |
| JP | 2008013377 A | 1/2008 | | |
| JP | 5600203 B1 | 10/2014 | | |
| JP | 2015122994 A | 7/2015 | | |
| RU | 2181126 C2 | 4/2002 | | |
| RU | 2493513 C2 | 9/2013 | | |
| SU | 1468872 A1 | 3/1989 | | |
| WO | 88/03433 A1 | 5/1988 | | |

OTHER PUBLICATIONS

Wikipedia "Archemedes' Screw" (2014) https://en.wikipedia.org/w/index.php?title=Archimedes%27_screw&oldid=616830908 (Year: 2014).*
Machine translation of JP 2004-313936 A (2004) (obtained from Google Patents Jul. 2020) (Year: 2004).*
European Search Report and Written Opinion for European patent application No. 15165677, dated Oct. 1, 2015.
Bermejo, M.D. et al. "Supercritical Water Oxidation: A technical Review" AIChE Journal, Nov. 2006, vol. 52, No. 11, pp. 3933-3951.
Boukis, N. et al., "Gasification of Wet Biomass in Supercritical Water. Results of Pilot Plant Experiments.", 14th European Biomass Conference, Paris, France 2005.
Boukis, N. et al. "Biomass Gasification in Supercritical Water. Experimental Progress Achieved with the Verena Pilot Plant." 15th European Biomass Conference and Exhibition, 2007.
Kruse, A., "Supercritical Water Gasification", Society of Chemical Industry and John Wiley & Sons, Ltd., 2008, pp. 415-437.
International Search Report and Written Opinion dated Jul. 20, 2016, for International Application PCT/EP2016/059546, filed Apr. 28, 2016.
Marrone, Ph, A., "Supercritical water oxidation - Current status of full-scale commercial activity for waste destruction", Journal of Supercritical Fluids 79 (2013), pp. 283-288.
Database WPI Week 201465 Thomson Scientific, London, GB; AN 2014-R69537 XP002745312, Oct. 1, 2014.
Office Action from the Patent Office of the Russian Federation for Russian patent application No. 2017139551/05, dated Aug. 1, 2019.
Search Report from the Federal Institute of Industrial Property for Russian patent application No. 2017139551/05, dated Aug. 1, 2019.
Brazilian Office Action dated Feb. 19, 2020, for corresponding Brazilian Patent Application No. 112017023174-3, filed Apr. 28, 2016.
Japanese Office Action dated Feb. 25, 2020, for corresponding Japanese Patent Application No. 2017-555765, filed Dec. 21, 2017.
International Preliminary Report on Patentability for International Patent Application No. PCT/EP2016/059546, completed Oct. 23, 2017.
Japanese Office Action for Japanese patent application No. 2017555765, dated Feb. 1, 2021, with English translation.
First Office Action from the Chinese Patent Office for Chinese patent application No. 201680024309.1, filed Apr. 28, 2016, dated Jun. 2, 2020.
Communication from the European Patent Office for European patent application No. 19172034.01, dated Oct. 16, 2020.

* cited by examiner

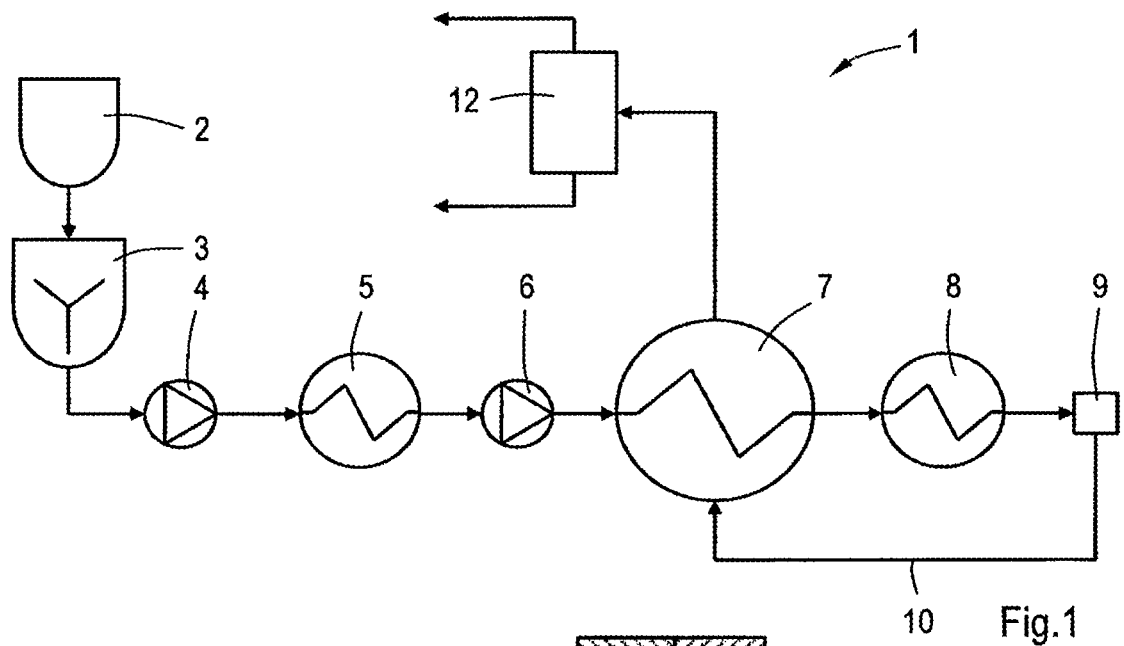
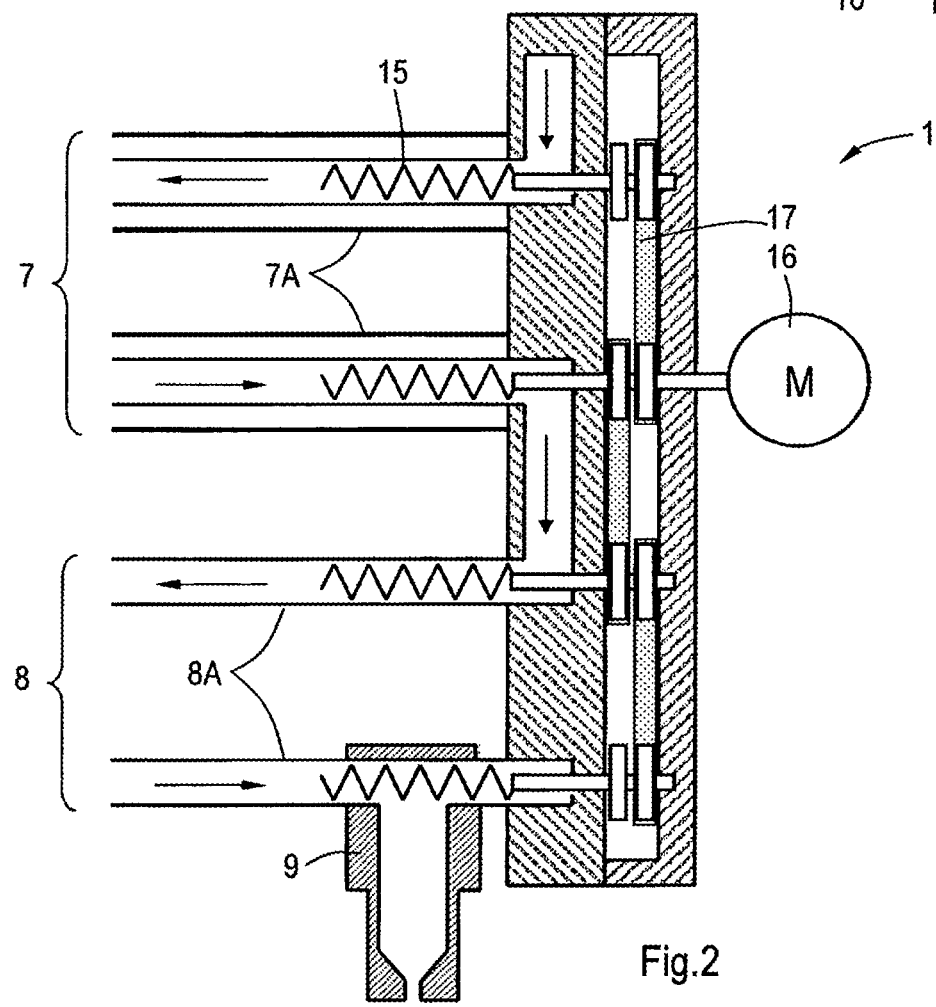

APPARATUS FOR AND METHOD OF PROCESSING A SLURRY CONTAINING ORGANIC COMPONENTS

The invention relates to an apparatus for and a method of processing a slurry containing organic components, such as biomass, having a water contents of at least 50%, preferably at least 60%, preferably at least 70%. The apparatus comprises a heat exchanger to heat the slurry, preferably to bring the liquid, e.g. water, in the slurry in a supercritical state (for water supercritical pressure and temperature are 221 bar and 374° C., respectively,) and a reactor to convert at least a part of the organic components in the slurry, e.g. to permanent vapors such as hydrogen and/or methane, e.g. by further heating the stream in a reactor, wherein at least one of the heat exchanger and the reactor comprises one or more pipes.

Feedstocks containing organic components are a tremendous potential resource for providing renewable energy and value-added products, especially in agricultural areas where waste biomass is abundant and/or where dedicated energy crops can be produced cheaply and efficiently.

As explained in Marrone, Ph. A., "Supercritical water oxidation—Current status of full-scale commercial activity for waste destruction", Journal of Supercritical Fluids 79 (2013), pages 283-288, supercritical water is a unique medium that has been studied for a growing and increasingly diverse number of applications. Above its thermodynamic critical point (374° C., 221 bar), water, like all supercritical fluids, exists as a single dense phase with transport properties comparable to those of a gas and solvent properties comparable to those of a liquid. Unlike other supercritical fluids, however, water undergoes a significant change in its solvent behavior between ambient and supercritical conditions. As water is heated under pressure, it loses a sufficient amount of its hydrogen bonding to transition from a highly polar solvent to nonpolar solvent. The result is that supercritical water becomes a very good solvent for nonpolar materials.

Bermejo, M. D., et al. "Supercritical Water Oxidation: A Technical Review", AIChE Journal, November 2006, Vol. 52, No. 11, pages 3933-3951, discusses aspects of supercritical water oxidation (SCWO) technology, including types of reactors for the SCWO process. "Because of its simplicity, the tubular reactor is the most widely used SCWO reactor, especially in small laboratory facilities such as those dedicated to essay the viability of new SCWO applications or to determine kinetic parameters or heats of reaction . . . . However, tubular reactors also present important disadvantages. In the first place, they tend to plug as a result of the precipitation of salts. Another important inconvenience is that the fast exothermic reactions can produce uncontrolled hot spots inside the reactor."

US 2003/075514 relates a system and method for performing hydrothermal treatment which includes a scraper formed as a hollow cylinder. The scraper is positioned in the reactor vessel with the scraper axis substantially colinear with the longitudinal axis of the cylindrical reactor vessel. A mechanism is provided to rotate the scraper about the longitudinal axis of the reactor vessel. One or more elongated scraper bars are positioned inside the reactor vessel between the scraper and the longitudinal axis of the reactor vessel. Each scraper bar may be held stationary with respect to the reactor vessel, or each scraper bar may rotated relative to an axis passing through the scraper bar to remove any solids that have accumulated on the scraper or on the scraper bar.

US 2013/0338382 relates to reaction apparatus "using supercritical water or subcritical water." As per claim 1 of US 2013/0338382, the apparatus comprises "a cylindrical mixing flow path for mixing at least one raw material fluid selected from the group consisting of glycerin, cellulose, and lignin with at least one of a supercritical water and a subcritical water; . . . and an agitation blade having a rotating shaft set on a center shaft of the mixing flow path."

It is an object of the present invention to provide an improved apparatus for and method of processing a slurry containing organic components, such as biomass.

To this end, the method according to the present invention is characterized in that at least one transport screw is accommodated in the pipe or at least one of the pipes. In an embodiment, the heat exchanger and the reactor each comprise one or more pipes and a transport screw is accommodated in at least one pipe of the heat exchanger and in at least one pipe of the reactor. In a further embodiment, transport screws are accommodated in all the pipes of the heat exchanger and of the reactor.

The use of one or more screws was found to provide effective continuous transport of solids, that would otherwise have a tendency to accumulate in the system e.g. by sticking to the walls of the pipe(s) or settling to the bottom of the pipe(s). The solids are preferably transported towards and into a solids trap and from there removed from the system. Thus, the present invention facilitates continuous processing of feedstocks with a relatively high contents of organic components and/or solids, improves heat exchange, reduces the risk of clogging and/or lengthens maintenance intervals for cleaning the heat exchanger and/or reactor pipes.

In an embodiment, the or at least one screw, preferably some or all screws, has (have) an open center, preferably providing unobstructed flow of the slurry or at least the liquid in the slurry through the center of the respective pipe, thus, e.g., allowing strong variations in flow velocity.

In an embodiment, the or at least one screw, preferably some or all screws, comprises (comprise) a helical element, preferably a screw ribbon.

In another embodiment, at least one screw, preferably some or all screws, comprises, e.g. is (are) coated with or contains, an agent, e.g. a catalyst, which interacts with the conversion of the organic components in the slurry. Such an agent can be employed e.g. to enhance conversion and/or to yield more methane at lower temperatures. Examples include a coating of a metal, e.g. copper or nickel.

A further embodiment comprises a motor for driving the transport screw or screws. In a refinement, the apparatus comprises a high pressure zone, encompassing at least the reactor and the heat exchanger, wherein the at least one motor is located outside the high pressure zone, e.g. in the surroundings of the reactor at atmospheric pressure. In a further refinement, the high pressure zone is sealed and the at least one motor is magnetically coupled to the transport screw or screws. In an example, the screws comprise protruding extensions that are part of the sealed zone and the motors are positioned near or about these extensions to establish a sufficiently strong magnetic coupling between the (extensions of the) screws in the high pressure zone and the motors outside the high pressure zone.

In another refinement, the motor is connected, via a transmission located in the high pressure zone, to two or more transport screws, preferably all transport screws. Thus, in principle, only a single motor and thus a single high-pressure seal is required.

In an embodiment, the outer diameter of the or at least one transport screw, preferably some or all screws, is (are) in a range from 0% to 15% smaller than the inner diameter of the pipe in which it is accommodated, preferably introducing sufficient play to allow expansion of the screws resulting from variations in temperature or rotation.

The invention further relates to a method of processing a slurry containing organic components, such as biomass, having a water contents of at least 50%, comprising the steps of increasing the pressure and temperature of the slurry to bring the water in the slurry in a supercritical state and converting at least a part of the organic components in the slurry, wherein at least one of increasing the pressure and temperature and converting at least a part of the organic components in the slurry is carried out in a pipe and characterized by transporting solids settling from the slurry through the pipe by means of one or more screws accommodated in the pipes.

In an embodiment, both increasing the pressure and temperature and converting at least a part of the organic components in the slurry is carried out in a pipe and the solids settling from the slurry are transported through the pipes by means of screw accommodated the pipes.

In Boukis, N., et al. "Gasification of wet biomass in supercritical water. Results of pilot plant experiments.", 14th European Biomass Conference, Paris, France 2005, it is mentioned that wet biomass reacts with water at supercritical conditions to form a gas rich in hydrogen.

In Boukis, N., et al. "Biomass gasification in supercritical water. Experimental progress achieved with the VERENA pilot plant." 15th European Biomass Conference & Exhibition 2007, it is mentioned that water-soluble salts will form solids under supercritical water conditions.

Kruse, A., "Supercritical water gasification", Society of Chemical Industry and John Wiley & Sons, Ltd, 2008, pages 415-437, reviews work relating to the supercritical water gasification of biomass with a focus on hydrogen production.

US 2014/0115955 relates to an apparatus for hydrocarbon synthesis. In some embodiments, the carbon feedstock can be subjected to an extrusion process. FIG. 2 shows a schematic diagram of an extrusion reactor, indicated by numeral 200 in that Figure. The reactor 200 includes an extrusion reactor housing 206 defining an input port 216 and an output port 218. The feedstock is conveyed and mixed by an extrusion screw 208.

DE 299 13 370 relates to a plant for the treatment of solids in supercritical water. FIG. 2 shows a transport screw 2.

JP 5 600203 relates to continuous hot water treatment of a cellulosic biomass slurry in a continuous reactor. The slurry is strongly agitated in the front stage of the continuous reactor and agitated with an agitator having a weak driving force in the rear stage, so that the plug flow is maintained.

EP 1 829 920 relates to a decomposition reaction apparatus for the decomposition treatment of a thermosetting resin. In the example shown in FIG. 1, a supply unit 3 includes a mixing device 31 for mixing the resin composition and the solvent and a pressurizing device 32 for forcedly feeding the mixture from the mixing device 31 to a main reaction body 21.

The invention will now be explained in more detail with reference to the figures, which schematically show an embodiment according to the present invention.

FIG. 1 is a flow diagram of an embodiment of an apparatus/method for hydrothermal conversion, e.g. supercritical water gasification, in accordance with the present invention.

FIG. 2 is a schematic cross-section of an apparatus comprising a transport screw according to the present invention.

FIG. 1 shows a system 1 for processing a slurry containing organic components, such as biomass, having a water contents of at least 50%, comprising a solid-liquid separator 2, such as a screw press, filter press, centrifuge, or dryer, to dewater the feed slurry and a tank 3 for holding the dewatered slurry. The tank is connected to a pump 4 which in turn is connected to or integrated with a heat exchanger 5 for adding residual heat to the slurry. Downstream from the heat exchanger 5 are a high-pressure pump 6 and a heat exchanger 7 to pressurize and heat the water in the slurry to supercritical or near-supercritical conditions.

In the present example, the heat exchanger comprises one or more counter-current pipe-in-pipe heat exchanger sections 7A, e.g. two, four or more pipe-in-pipe heat exchanger sections, extending horizontally and parallel to one another and connected in series. Downstream from the pump 6 and heat exchanger 7 is a further heat exchanger, which serves as a reactor 8. In the present example, the reactor comprises one or more pipes 8A, e.g. two pipes 8A, which are externally heated.

The downstream end of the reactor and optionally also of the heat exchanger 7 is connected to a solids trap 9 to remove solids, such as inorganics and/or precipitated minerals and salts, from the system.

As indicated by a solid line 10 in FIG. 1, the downstream end of the reactor 8 is connected to the outer pipe of the heat exchanger 7, to provide counter-current heat exchange between the (relatively hot) converted slurry and the (relatively cold) slurry before conversion. The outer pipes of the heat exchanger 7 are connected to gas-liquid separator 12, to separate the gaseous products from the liquid.

As shown in more detail in FIG. 2, a transport screw, in this example a screw ribbon 15, is accommodated in all the pipes 7A, 8A of the heat exchanger 7 and of the reactor 8.

The system further comprises a high pressure zone, encompassing at least the reactor 8 and the heat exchanger 7 and a motor 16 located outside the high pressure zone. The motor is connected, via a transmission 17, which can be located in the high or low pressure zone, to all transport screw ribbons 15 to drive them all in the same direction of rotation. To ensure transport of the solids in the flow direction of the slurry (indicated by arrows), in this example the helicity of the screws changes from one screw to the next.

During operation, in an example, wet biomass (manure) having a water content of 90% is dewatered by means of a screw press 2 to a water content of 70% (totals solids 30%) and the thickened and viscous slurry is fed to the tank 3. From there, the slurry is pumped (at 1000 liters/hour) to the heat exchanger 5 and mixed with water to a water content of 75% and a volume of 2000 nL/h. The slurry is then pressurized and heated (240-250 bar, and 370-390° C.) and fed to the reactor, where the slurry is further heated (to 550-600° C.) to convert at least a part of the organic components in the slurry to gaseous product, e.g., hydrogen and methane. During heating and conversion and both in the subcritical state and in the supercritical state, solids settling from the slurry are continuously transported through the pipes 7A, 8A by means of the screws 15, which rotate at e.g. 5 to 10 rpm, and into the solids trap 9. The water is fed to the heat exchanger 7 to recover high temperature heat, i.e. to heat the colder upstream slurry. After leaving the heat exchanger (at 2000 nL/h, 240-250 bar, and 250-300° C.), the liquid is fed to the gas/liquid separator to allow the gaseous product to escape and to enable collection. The solids trap is emptied at regular intervals.

The method and system according to the present invention enable continuous processing of feedstocks with a relatively high contents of organic components and/or solids, while reducing the risk of clogging and/or lengthening maintenance intervals for cleaning the heat exchanger and/or reactor pipes and/or improving heat exchange between the viscous, high solids, relatively cold slurry in the inner pipes with the relatively hot fluid in the outer pipes.

The invention is not restricted to the above-described embodiments, which can be varied in a number of ways within the scope of the claims. For instance, the screw may comprise a pipe with a series of openings in its wall and with a helical element, e.g. a wire, wound around and attached, e.g. welded, to it. The screw can be made of metal or, e.g., of a synthetic material, such as an engineering polymer. In another example, the screw has a solid centre.

The invention claimed is:

1. An apparatus for processing a slurry containing organic components, having a water content of at least 50 wt %, comprising: a high pressure zone and a high pressure pump to pressurize water in the slurry to supercritical conditions in the high pressure zone; wherein the high pressure zone includes a heat exchanger configured to heat the slurry and a reactor comprising one or more pipes and configured to receive the heated slurry and convert at least a part of the organic components in the slurry to a gaseous product, wherein at least one transport screw has an open center and is accommodated in the one or more pipes of the reactor, and wherein the open center of the at least one transport screw provides an unobstructed path for the slurry or at least the water in the slurry to flow through the respective pipe.

2. The apparatus according to claim 1, wherein the heat exchanger and the reactor each comprise one or more pipes and a heat exchanger transport screw is accommodated in at least one pipe of the heat exchanger.

3. The apparatus according to claim 2, wherein a transport screw is accommodated in all the pipes of the heat exchanger and of the reactor.

4. The apparatus according to claim 1, wherein the at least one transport screw in the reactor comprises a plurality of screws, and wherein some screws each have an open center.

5. The apparatus according to claim 1, wherein the at least one transport screw in the reactor comprises a helical element.

6. The apparatus according to claim 5, wherein the at least one transport screw in the reactor comprises a screw ribbon.

7. The apparatus according to claim 1, wherein the at least one transport screw in the reactor includes a catalyst.

8. The apparatus according to claim 1, comprising at least one motor configured to drive the at least one transport screw in the reactor.

9. The apparatus according to claim 8, comprising a high pressure zone, encompassing at least the reactor and the heat exchanger, wherein the at least one motor is located outside the high pressure zone.

10. The apparatus according to claim 9, wherein the high pressure zone is sealed and the at least one motor is magnetically coupled to the at least one transport screw in the reactor.

11. The apparatus according to claim 1, where the at least one transport screw in the reactor comprises two transport screws with opposite helicity.

12. The apparatus according to claim 1, wherein an outer diameter of the at least one transport screw in the reactor is in a range from 0% to 15% smaller than an inner diameter of a pipe in which the at least one transport screw is accommodated.

13. The apparatus according to claim 1, comprising a solids trap, the at least one transport screw in the reactor extending through or over the solids trap.

14. A method of processing a slurry containing organic components having a water content of at least 50 wt %, comprising:
increasing a pressure and a temperature of the slurry to bring water in the slurry to a supercritical state in a high pressure zone using a high pressure pump, the high pressure zone encompassing a heat exchanger and a reactor having a pipe with a screw having an open center;
converting at least a part of the organic components in the pressurized and heated slurry in the reactor to gaseous product; and
transporting solids settling from the slurry through the pipe by the screw,
wherein the open center of the screw provides an unobstructed path for the slurry or at least the water in the slurry to flow through the pipe.

15. The method according to claim 14, wherein
increasing the pressure and temperature is carried out in a transport pipe and the slurry is transported through the transport pipe by a second screw accommodated in the transport pipe.

16. The apparatus of claim 1 wherein the at least one transport screw comprises a plurality of screws, each screw having an open center.

17. The apparatus of claim 1 wherein the at least one transport screw comprises a plurality of screws, each screw having a helical element.

18. The apparatus of claim 1 wherein the at least one transport screw comprises a plurality of screws, each screw comprising a screw ribbon.

19. The apparatus of claim 1 wherein the at least one transport screw comprises a plurality of screws, each screw including a catalyst.

20. The apparatus of claim 1 wherein the at least one transport screw comprises a plurality of screws, and wherein an outer diameter of each screw is in a range from 0% to 15% smaller than an inner diameter of a pipe in which each screw is accommodated.

21. An apparatus for processing a slurry containing organic components having a water content of at least 50 wt %, comprising: a high pressure zone and a high pressure pump to pressurize water in the slurry to supercritical conditions in the high pressure zone; wherein the high pressure zone includes a heat exchanger to bring the water in the slurry to a supercritical state and a reactor configured to receive the slurry in the supercritical state and to convert at least a part of the organic components in the slurry to gaseous product, wherein the reactor comprises one or more pipes; a solids trap; and at least one transport screw being accommodated in at least one pipe of the reactor, wherein the at least one transport screw has an open center for the flow of water that extends through or over the solids trap.

* * * * *